US009645608B1

(12) United States Patent
Tsai et al.

(10) Patent No.: US 9,645,608 B1
(45) Date of Patent: May 9, 2017

(54) PORTABLE ELECTRONIC DEVICE (71) Applicants: Inventec (Pudong) Technology Corporation, Shanghai (CN); INVENTEC CORPORATION, Taipei (TW)

(72) Inventors: Yi-Ling Tsai, Taipei (TW); Kuo-Yang Cheng, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 15/166,247

(22) Filed: May 26, 2016

(30) Foreign Application Priority Data

Nov. 27, 2015 (CN) .......................... 2015 1 0849664

(51) Int. Cl.
G06F 1/16 (2006.01)
G06F 3/02 (2006.01)
H04M 1/02 (2006.01)

(52) U.S. Cl.
CPC ............ G06F 1/1616 (2013.01); G06F 1/169 (2013.01); G06F 1/1681 (2013.01); G06F 3/0202 (2013.01); *G06F 1/1632* (2013.01); *G06F 1/1654* (2013.01); *G06F 1/1669* (2013.01); *G06F 1/1679* (2013.01); *H04M 1/0254* (2013.01)

(58) Field of Classification Search
CPC .... G06F 1/1632; G06F 1/1654; G06F 1/1669; G06F 1/1681; G06F 1/1679; G06F 3/0202; G06F 1/1616; H04M 1/0254

USPC ........... 361/679.41, 679.43, 679.55, 679.57, 361/679.58

See application file for complete search history.

(56) References Cited

U.S. PATENT DOCUMENTS

| | | | |
|---|---|---|---|
| 2014/0267050 A1* | 9/2014 | Spollen ................ | G06F 3/0219 345/168 |
| 2014/0328014 A1* | 11/2014 | Lan ....................... | G06F 1/1681 361/679.27 |
| 2014/0340840 A1* | 11/2014 | Han ...................... | G06F 1/1632 361/679.43 |

* cited by examiner

*Primary Examiner* — James Wu
(74) *Attorney, Agent, or Firm* — CKC & Partners Co., Ltd.

(57) ABSTRACT

A portable electronic device includes an expansion assembly and a tablet computer. The expansion assembly includes a hinge base, a rotating element, and a first magnet. The hinge base is located on the expansion assembly and has a first concave portion. The rotating element is pivoted to the first concave portion. The first magnet is located on the hinge base. The position of the first magnet corresponds to the position of the rotating element. The tablet computer includes a housing and a second magnet. The housing has a second concave portion. The position of the second concave portion corresponds to the position of the first concave portion and the second concave portion has an oblique wall. The second magnet is located on the oblique wall and the magnetic force of the second magnet is greater than the magnetic force of the first magnet.

10 Claims, 6 Drawing Sheets

PORTABLE ELECTRONIC DEVICE

RELATED APPLICATIONS

This application claims priority to Chinese Application Serial Number 201510849664.X, filed Nov. 27, 2015, which is herein incorporated by reference.

BACKGROUND

Field of Invention

The present invention relates to a portable electronic device.

Description of Related Art

Generally, a two-in-one detachable laptop computer (i.e., a detachable NB) is composed of a tablet computer and a keyboard device. In order to let users can adjust the inclination of the screen of the tablet computer on the keyboard device after the tablet computer is connected to the keyboard device, a recess is usually designed in a side of the tablet computer and a protruding pillar is usually designed on a side of the keyboard device having a hinge base by manufacturer. When the recess of the tablet computer is coupled to the protruding pillar of the hinge base, the tablet computer may receive a force to rotate the hinge base through the protruding pillar.

However, after the tablet computer is separated from the keyboard device, the protruding pillar of the keyboard device protrudes from the hinge base too much, such as in a range from about 6 mm to 8 mm. As a result, not only is the outer appearance of the keyboard device limited, but also the protruding pillar may easily be damaged by an external force since the protruding pillar protrudes outward too much. In addition, if the height of the protruding pillar of the keyboard device is reduced, the protruding pillar on the hinge base may easily be separated from the recess of the tablet computer when the tablet computer is rotated on the hinge base of the keyboard device, which is an inconvenient factor for users.

SUMMARY

An aspect of the present invention is to provide a able electronic device.

According to an embodiment of the present invention, a portable electronic device includes an expansion assembly and a tablet computer. The expansion assembly includes a hinge base, a rotating element, and a first magnet. The hinge base is located on a side of the expansion assembly and has a first concave portion. An end of the rotating element is pivoted to the first concave portion. The first magnet is located on the hinge base. The position of the first magnet corresponds to the position of the rotating element. When the rotating element is attached to the first magnet, the rotating element is accommodated in the first concave portion. A side of the tablet computer is detachably disposed on the hinge base and includes a housing and a second magnet. The housing has a second concave portion. The position of the second concave portion corresponds to the position of the first concave portion. The second concave portion has an oblique wall. The second magnet is located on the oblique wall. The magnetic force of the second magnet is greater than the magnetic force of the first magnet. When the second concave portion is adjacent to the first concave portion, the rotating element is attracted by the second magnet to pivot to the second concave portion from the first concave portion, such that the rotating element is attached to the second magnet.

In an embodiment of the present invention, the first concave portion has a sidewall. When the rotating element is attached to the first magnet, the rotating element is abutted against the sidewall, and the sidewall is between the rotating element and the first magnet.

In an embodiment of the present invention, when the rotating element is attached to the second magnet, the rotating element is abutted against the oblique wall, and the oblique wall is between the rotating element and the second magnet.

In an embodiment of the present invention, an included angle is formed between the oblique wall and the side of the tablet computer and is in a range from 30° to 80°.

In an embodiment of the present invention, the expansion assembly further includes a third magnet that is located on the hinge base. The tablet computer further includes a fourth magnet that is located on the housing. The position of the third magnet corresponds to the position of the fourth magnet. The polarity of the third magnet facing the fourth magnet is opposite to the polarity of the fourth magnet facing the third magnet.

In an embodiment of the present invention, the expansion assembly further includes a fifth magnet that is located on the hinge base. The third magnet is between the fifth magnet and the first concave portion. The tablet computer further includes a sixth magnet that is located on the housing. The fourth magnet is between the sixth magnet and the second concave portion. The position of the fifth magnet corresponds to the position of the sixth magnet. The polarity of the fifth magnet facing the sixth magnet is opposite to the polarity of the sixth magnet facing the fifth magnet.

In an embodiment of the present invention, the polarity of the fifth magnet facing the sixth magnet is opposite to the polarity of the third magnet facing the fourth magnet.

In an embodiment of the present invention, the polarity of the sixth magnet facing the fifth magnet is opposite to the polarity of the fourth magnet facing the third magnet.

In an embodiment of the present invention, the expansion assembly has a first electrical contact. The first concave portion is between the first electrical contact and the third magnet. The tablet computer has a second electrical contact. The second concave portion is between the second electrical contact and the fourth magnet. When the rotating element is attached to the second magnet, the second electrical contact is electrically connected to the first electrical contact.

In an embodiment of the present invention, the expansion assembly includes a keyboard module and a touch pad module.

In the aforementioned embodiments of the present invention, since the expansion assembly has the hinge base, the rotating element, and the first magnet and the hinge base has the first concave portion for accommodating the rotating element, the rotating element may be accommodated in the first concave portion and does not protrude from the hinge base when the rotating element is attached to the first magnet. Moreover, the housing of the tablet computer has the second concave portion, and the second magnet is located on the oblique wall of the second concave portion. Hence, when the second concave portion is adjacent to the first concave portion, the second magnet having a magnetic force that is greater than the magnetic force of the first magnet may attract the rotating element to leave the first magnet from the first concave portion and to pivot to the second concave portion, such that the rotating element is attached to the second magnet.

As a result, the tablet computer may receive a force to rotate the hinge base through the rotating element, thereby adjusting the inclination of the tablet computer. In addition, when the tablet computer is separated from the expansion assembly, the rotating element may slide out along the oblique wall of the second concave portion and return to the first concave portion due to the magnetic force of the first magnet. Therefore, it is helpful to the outer appearance of the expansion assembly, and the rotating element is not easily damaged by an external force because the rotating element is located in the hinge base and does not protrude outward too much.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
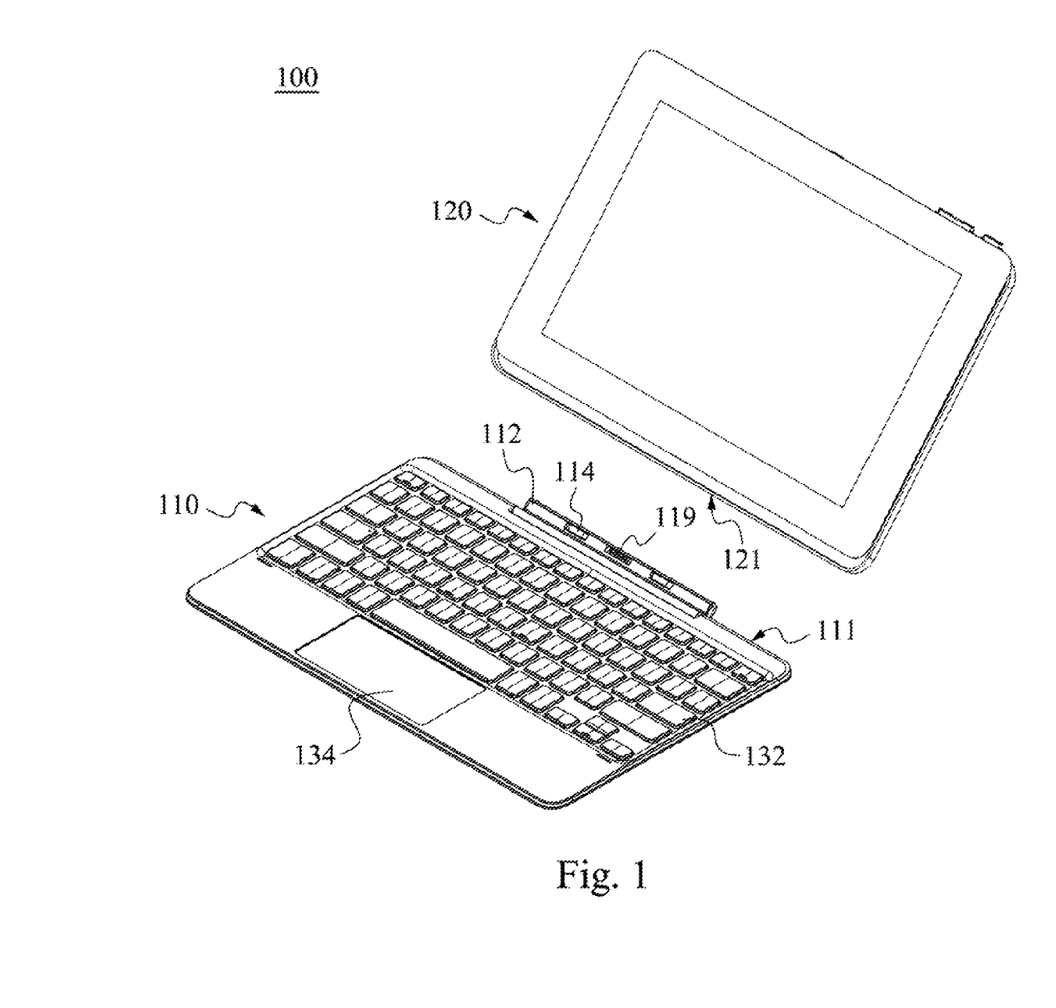
FIG. 1 is an exploded view of a portable electronic device according to one embodiment of the present invention.
Figure 2:
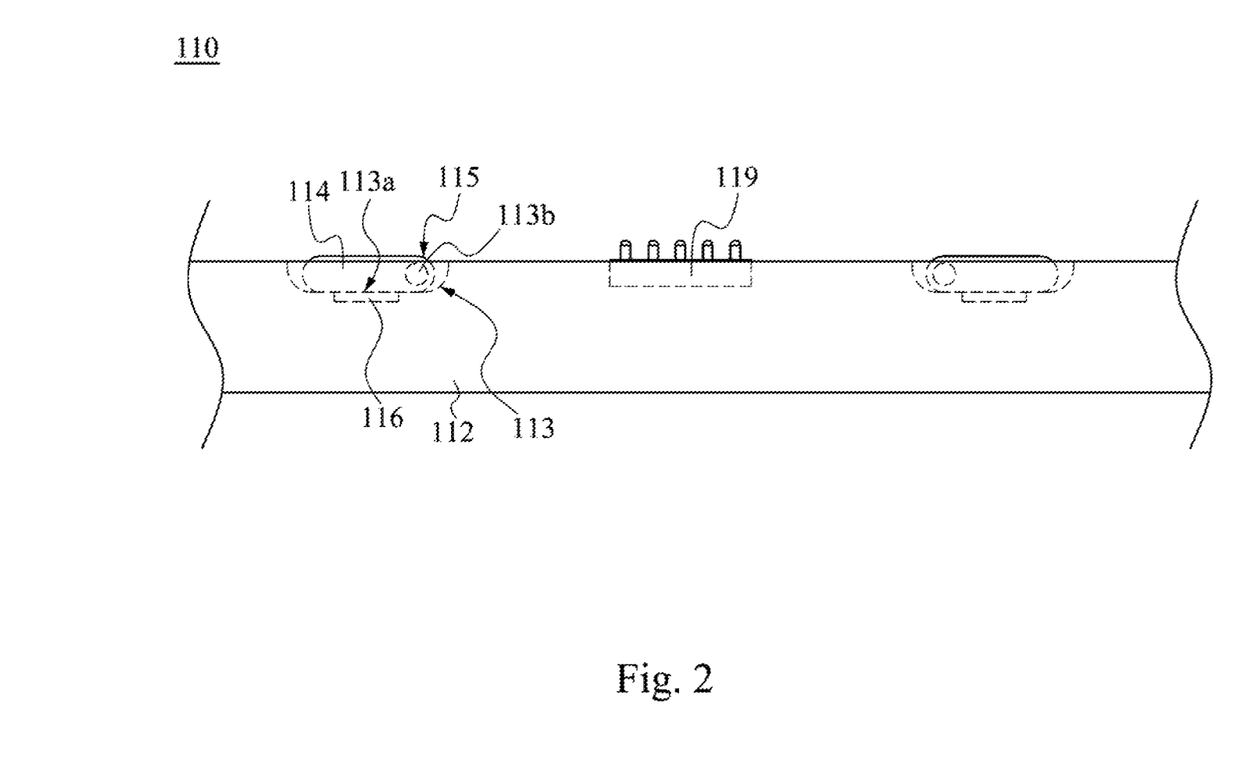
FIG. 2 is a partially enlarged view of an expansion assembly shown in FIG. 1.

FIG. 1 is an exploded view of a portable electronic device 100 according to one embodiment of the present invention. FIG. 2 is a partially enlarged view of an expansion assembly 110 shown in FIG. 1. As shown in FIG. 1 and FIG. 2, the portable electronic device 100 includes the expansion assembly 110 and a tablet computer 120. The expansion assembly 110 includes a hinge base 112, a rotating element 114, and a first magnet 116. The hinge base 112 is located on a side 112 of the expansion assembly 110 and has a first concave portion 113. An end 115 of the rotating element 114 is pivoted to the first concave portion 113. The first magnet 116 is located on the hinge base 112, and the position of the first magnet 116 corresponds to the position of the rotating element 114. The rotating element 114 is made of a material including metal, and the first magnet 116 may be used to attract the rotating element 114. When the rotating element 114 is attached to the first magnet 116, the rotating element 114 may be accommodated in the first concave portion 113 of the hinge base 112 and does not protrude from the hinge base 112 too much, such as protruding outward by 0.7 mm. Such a design is helpful to the outer appearance of the expansion assembly 110.

Furthermore, the first concave portion 113 of the hinge base 112 has a sidewall 113a. When the rotating element 114 is attached to the first magnet 116, the rotating element 114 is abutted against the sidewall 113a, and the sidewall 113a is between the rotating element 114 and the first magnet 116. In other words, the rotating element 114 and the first magnet 116 are respectively located at two opposite sides of the sidewall 113a In addition, the first concave portion 113 has a pivot 113b, and an end 115 of the rotating element 114 is sleeved on the pivot 113b. Therefore, the rotating element 114 may be pivoted on the pivot 113b.

In this embodiment, the expansion assembly 110 has a first electrical contact 119. The first electrical contact 119 may be used to electrically connect to the tablet computer 120. The expansion assembly 110 may selectively include a keyboard module 132, a touch pad module 134, and other different types of input/output (I/O) module, such as a USB port, a memory card port, a network port, and a monitor port as deemed necessary by designers, and the present invention is not limited in this regard.

Figure 3:
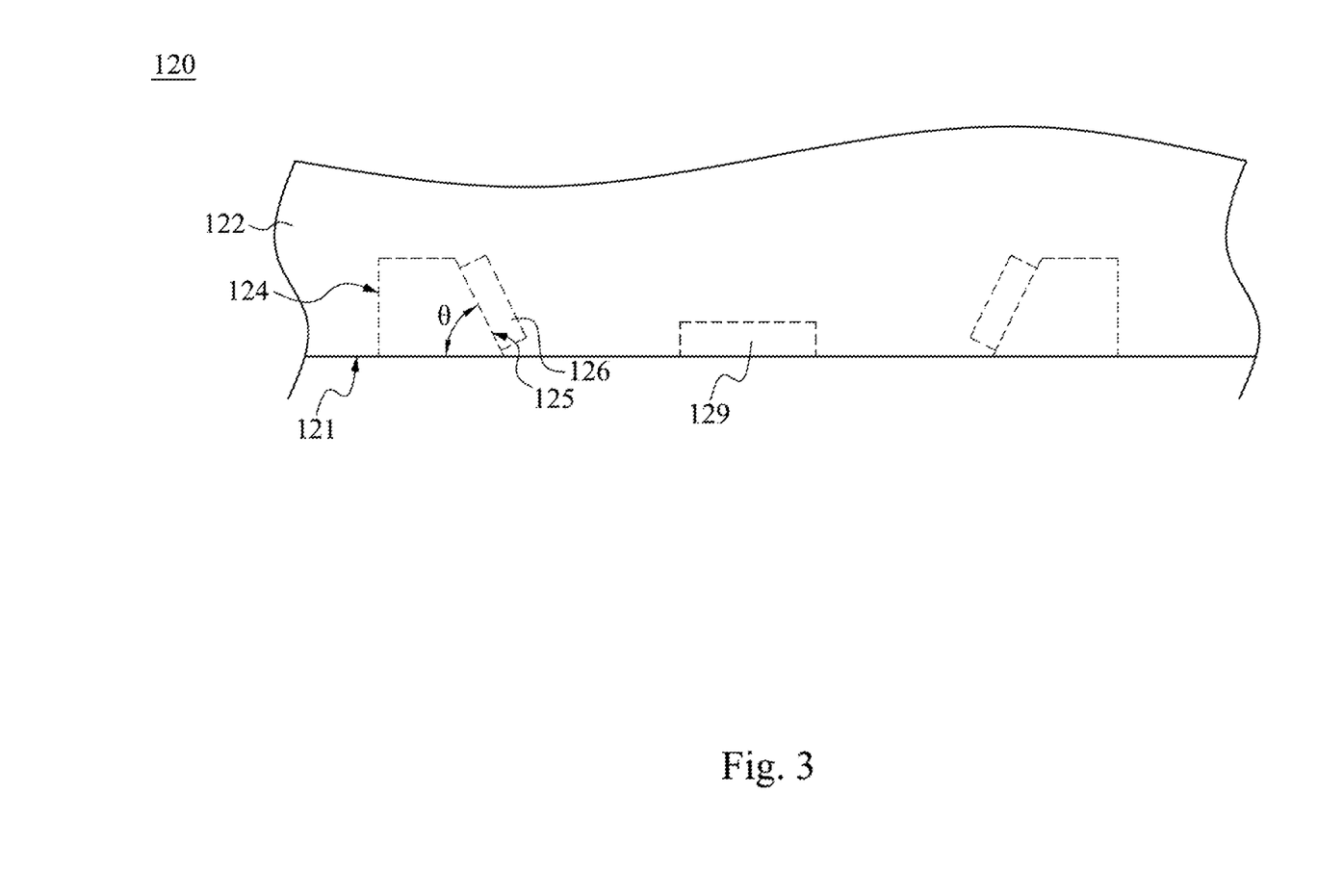
FIG. 3 is a partially enlarged view of a tablet computer shown in FIG. 1.

FIG. 3 is a partially enlarged view of the tablet computer 120 shown in FIG. 1. As shown in FIG. 1 and FIG. 3, a side 121 of the tablet computer 120 is detachably disposed on the hinge base 112 of the expansion assembly 110. The side 121 of the tablet computer 120 includes a housing 122 and a second magnet 126. The housing has a second concave portion 124. The second concave portion 124 has an oblique wall 125, and the second magnet 126 is located on the oblique wall 125. In this embodiment, an included angle θ formed between the oblique wall 125 of the second concave portion 124 and the side 121 of the tablet computer 120 is in a range from 30° to 80°, such as 70°. In addition, the tablet computer has a second electrical contact 129. The second electrical contact 129 may be used to electrical connect the first electrical contact 119 of the expansion assembly 110.

It is to be noted that the materials and the connection relationships of the elements described above will not be repeated in the following description. In the following description, the state of the tablet computer 120 that is assembled to the expansion assembly 110 will be described.

Figure 4:
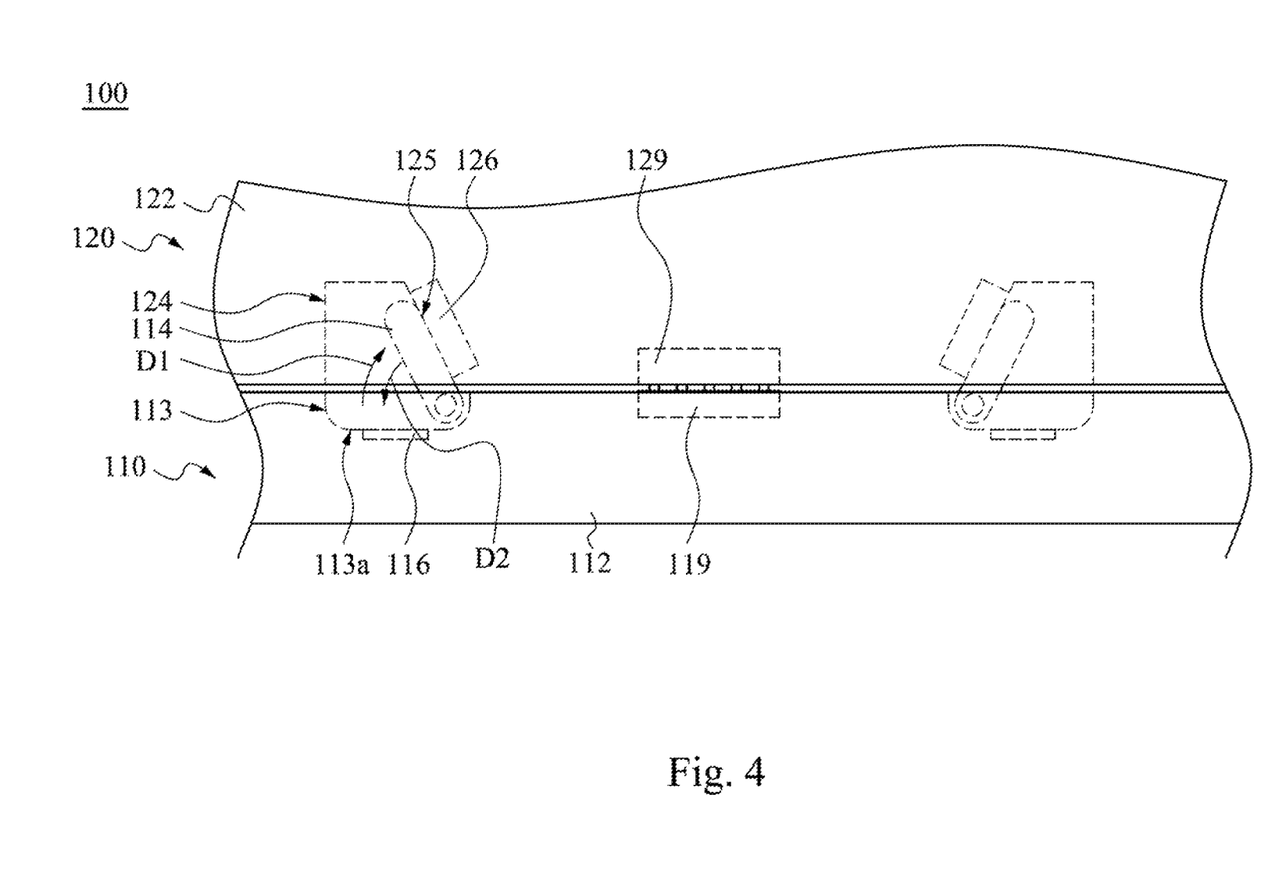
FIG. 4 is a partially enlarged view of the tablet computer shown in FIG. 1 after being connected to the expansion assembly.

FIG. 4 is a partially enlarged view of the tablet computer 120 shown in FIG. 1 after being connected to the expansion assembly 110. As shown in FIG. 1 and FIG. 4, the position of the second concave portion 124 of the housing 122 of the tablet computer 120 corresponds to the position of the first concave portion 113 of the hinge base 112 of the expansion assembly 110. Moreover, the magnetic force of the second magnet 126 is greater than the magnetic force of the first magnet 116. When the second concave portion 124 of the tablet computer 120 is adjacent to the first concave portion 113 of the hinge base 112, since the second magnet 126 is located on the oblique wall 125 of the second concave portion 124, the second magnet 126 having the magnetic force that is greater than the magnetic force of the first magnet 116 may attract the rotating element 114 to leave the first magnet 116 from the first concave portion 113 and to pivot into the second concave portion 124 in a direction D1 such that the rotating element 114 is attached to the second magnet 126 and is abutted against the oblique wall 125. In this state, the oblique wall 125 is between the rotating element 114 and the second magnet 126, and the second electrical contact 129 of the tablet computer 120 is electrically connected to the first electrical contact 119 of the expansion assembly 110.

As a result, the tablet computer 120 may receive a force to rotate the hinge base 112 through the rotating element 114 that is pivoted into the second concave portion 124, thereby adjusting the inclination of the tablet computer 120. In addition, when the tablet computer 120 is separated from the expansion assembly 110, the rotating element 114 may slide out along the oblique wall 125 of the second concave portion 124 and pivot in a direction D2 to return to the first concave portion 113 due to the magnetic force of the first magnet 116. Therefore, it is helpful to the outer appearance of the expansion assembly 110, and the rotating element 114 not easily damaged by an external force because the rotating element 114 is located in the first concave portion 113 and does not protrude outward too much when the expansion assembly 110 is not used by the tablet computer 120.

Figure 5:
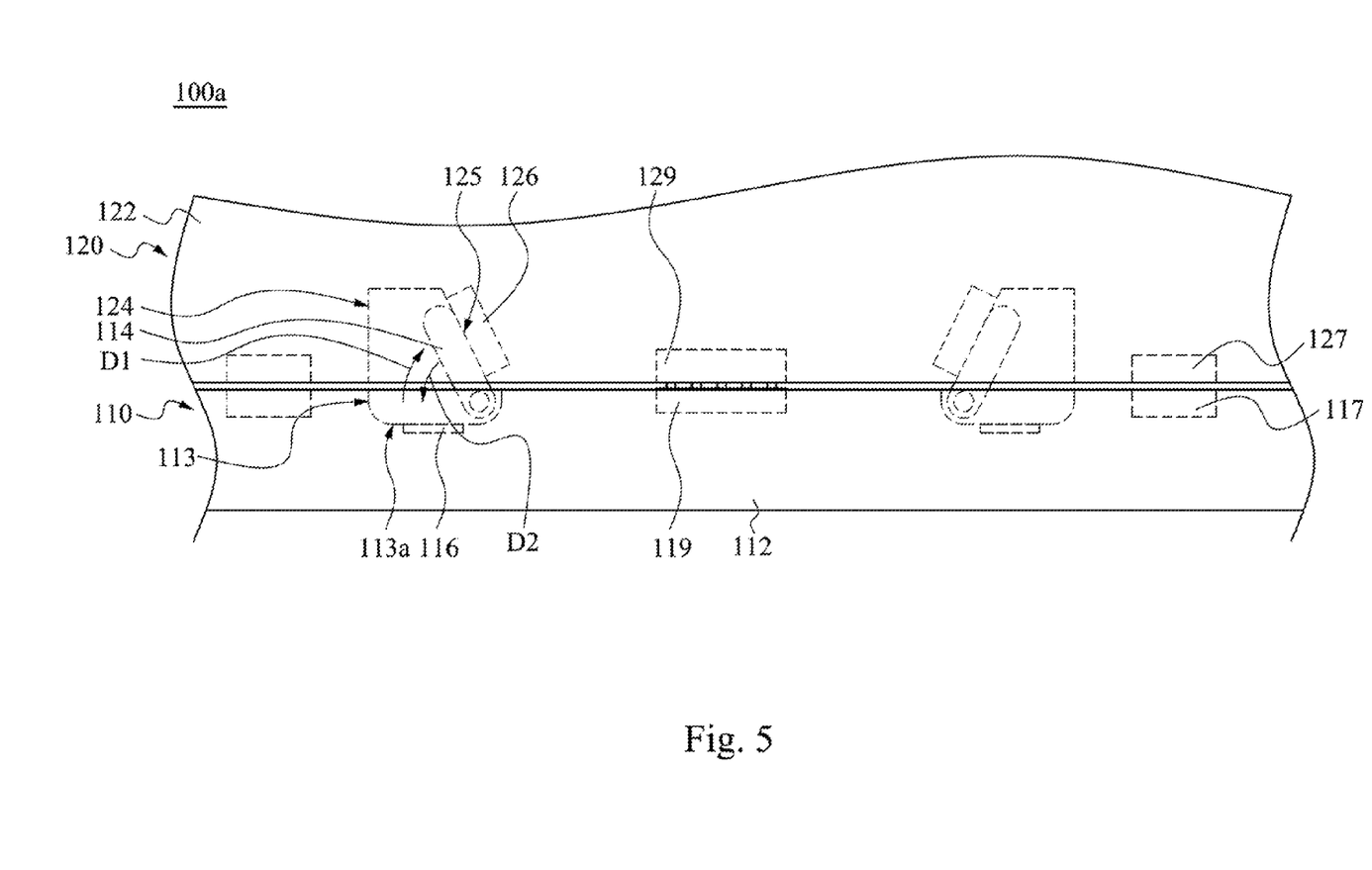
FIG. 5 is a partially enlarged of a portable electronic device according to another embodiment of the present invention.

FIG. 5 is a partially enlarged of a portable electronic device 100a according to another embodiment of the present invention. The portable electronic device 100a includes the expansion assembly 110 and the tablet computer 120. The difference between this embodiment and the embodiment shown in FIG. 4 is that the expansion assembly 110 of the portable electronic device 100a further includes a third magnet 117 and the tablet computer 120 of the portable electronic device 100a further includes a fourth magnet 127. The third magnet 117 is located on the hinge base 112 and the fourth magnet 127 is located on the housing 122. The position of the third magnet 117 corresponds to the position of the fourth magnet 127. Moreover, the polarity of the third magnet 117 facing the fourth magnet 127 (e.g., N pole) is opposite to the polarity of the fourth magnet 127 facing the third magnet 117 (e.g., S pole). As a result of such a design, not only the rotating element 114 may pivot into the second concave portion 124 and is attached to the second magnet 126, but also the positioning capability of the tablet computer 120 and the expansion assembly 110 may be improved through the third and fourth magnets 117, 127.

In this embodiment, the first concave portion 113 of the hinge base 112 is between the first electrical contact 119 and the third magnet 117. The second concave portion 124 of the housing 122 of the tablet computer 120 is between the second electrical contact 129 and the fourth magnet 127.

Figure 6:
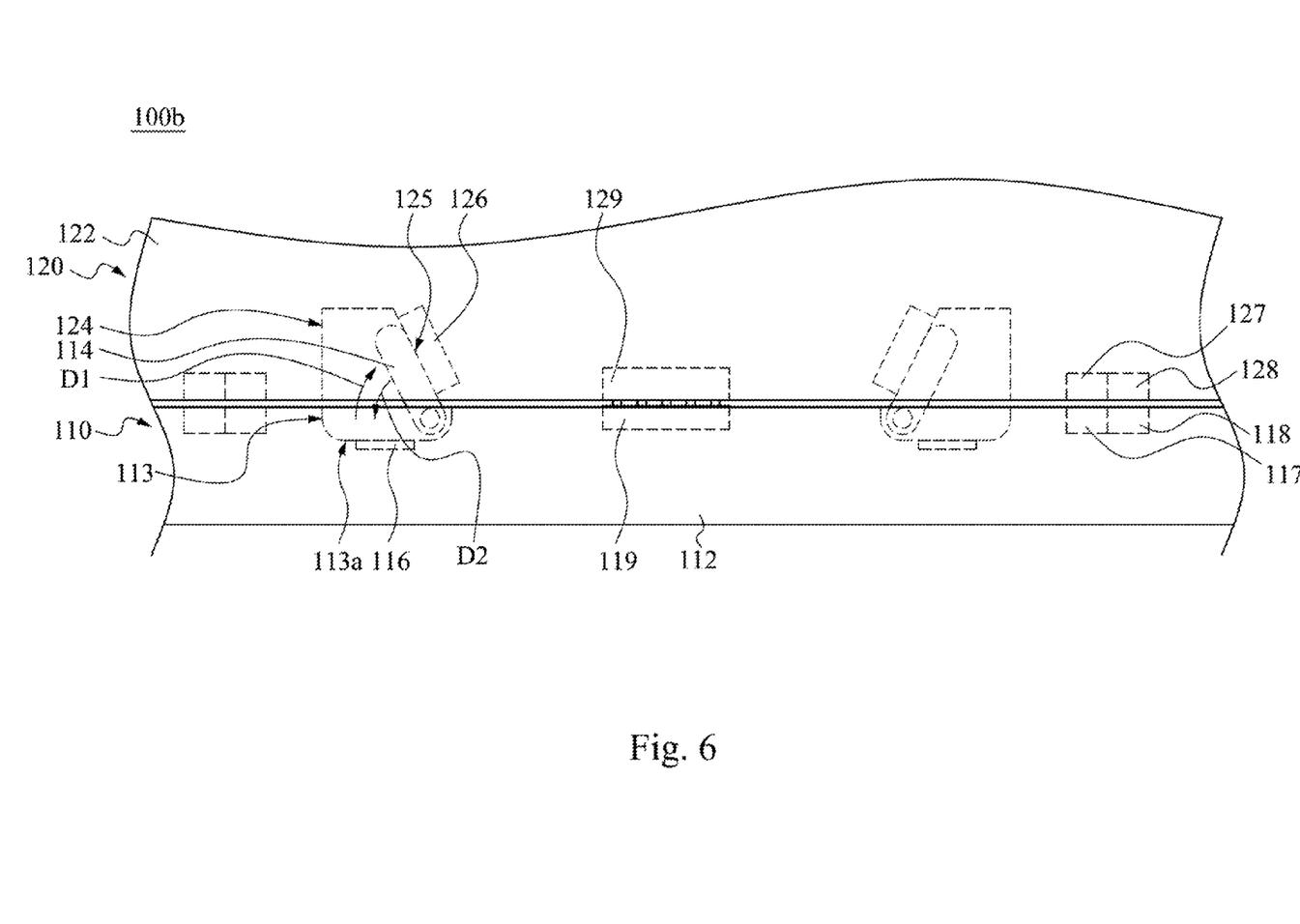
FIG. 6 is a partially enlarged of a portable electronic device according to another embodiment of the present invention.

FIG. 6 is a partially enlarged of a portable electronic device 100b according to another embodiment of the present invention. The portable electronic device 100b includes the expansion assembly 110 and the tablet computer 120. The difference between this embodiment and the embodiment shown in FIG. 5 is that the expansion assembly 110 of the portable electronic device 100b further includes a fifth magnet 118, and the tablet computer 120 of the portable electronic device 100b further includes a sixth magnet 128. The fifth magnet 118 is located on the hinge base 112, and the third magnet 117 is between the fifth magnet 118 and the first concave portion 113. The sixth magnet 128 is located on the housing 122, and the fourth magnet 127 is between the sixth magnet 128 and the second concave portion 124. The position of the fifth magnet 118 corresponds to the position of the sixth magnet 128, and the polarity of the fifth magnet 118 facing the sixth magnet 128 (e.g., S pole) is opposite to the polarity of the sixth magnet 128 facing the fifth magnet 118 (e.g., N pole). Furthermore, the polarity of the fifth magnet 118 facing the sixth magnet 128 (e.g., S pole) is opposite to the polarity of the third magnet 117 facing the fourth magnet 127 (e.g., N pole). The polarity of the sixth magnet 128 facing the fifth magnet 118 (e.g., N pole) is opposite to the polarity of the fourth magnet 127 facing the third magnet 117 (e.g., S pole).

In this embodiment, through the polarity configuration of the third magnet 117, the fourth magnet 127, the fifth magnet 118, and the sixth magnet 128, the traction capability of the portable electronic device 100b may be effectively improved. That is helpful to assembly and positioning efficacy between the tablet computer 120 and the expansion assembly 110.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims.

What is claimed is:

1. A portable electronic device, comprising:
an expansion assembly comprising:
a hinge base located on a side of the expansion assembly and having a first concave portion;
a rotating element, wherein an end of the rotating element is pivoted to the first concave portion; and
a first magnet located on the hinge base, wherein a position of the first magnet corresponds to a position of the rotating element; when the rotating element is attached to the first magnet, the rotating element is accommodated in the first concave portion; and
a tablet computer, wherein a side of the tablet computer is detachably disposed on the hinge base and comprises:
a housing having a second concave portion, wherein a position of the second concave portion corresponds to a position of the first concave portion, and the second concave portion has an oblique wall; and
a second magnet located on the oblique wall, wherein a magnetic force of the second magnet is greater than a magnetic force of the first magnet; when the second concave portion is adjacent to the first concave portion, the rotating element is attracted by the second magnet to pivot to the second concave portion from the first concave portion, such that the rotating element is attached to the second magnet.

2. The portable electronic device of claim 1, wherein the first concave portion has a sidewall, and when the rotating element is attached to the first magnet, the rotating element is abutted against the sidewall, and the sidewall is between the rotating element and the first magnet.

3. The portable electronic device of claim 1, wherein when the rotating element is attached to the second magnet, the rotating element is abutted against the oblique wall, and the oblique wall is between the rotating element and the second magnet.

4. The portable electronic device of claim 1, wherein an included angle is formed between the oblique wall and the side of the tablet computer and is in a range from 30° to 80°.

5. The portable electronic device of claim 1, wherein the expansion assembly further comprises a third magnet that is located on the hinge base, and the tablet computer further comprises a fourth magnet that is located on the housing, and a position of the third magnet corresponds to a position of the fourth magnet, and a polarity of the third magnet facing the fourth magnet is opposite to a polarity of the fourth magnet facing the third magnet.

6. The portable electronic device of claim 5, wherein the expansion assembly further comprises a fifth magnet that is located on the hinge base, and the third magnet is between the fifth magnet and the first concave portion, and the tablet computer further comprises a sixth magnet that is located on the housing, and the fourth magnet is between the sixth magnet and the second concave portion, and a position of the fifth magnet corresponds to a position of the sixth magnet, and a polarity of the fifth magnet facing the sixth magnet is opposite to a polarity of the sixth magnet facing the fifth magnet.

7. The portable electronic device of claim 6, wherein the polarity of the fifth magnet facing the sixth magnet is opposite to the polarity of the third magnet facing the fourth magnet.

8. The portable electronic device of claim 6, wherein the polarity of the sixth magnet facing the fifth magnet is opposite to the polarity of the fourth magnet facing the third magnet.

9. The portable electronic device of claim 5, wherein the expansion assembly has a first electrical contact, and the first concave portion is between the first electrical contact and the third magnet, and the tablet computer has a second electrical contact, and the second concave portion is between the second electrical contact and the fourth magnet, and when the rotating element is attached to the second magnet, the second electrical contact is electrically connected to the first electrical contact.

10. The portable electronic device of claim 1, wherein the expansion assembly comprises a keyboard module and a touch pad module.

* * * * *